United States Patent Office 3,509,181
Patented Apr. 28, 1970

3,509,181
FURFURYL AND TETRAHYDROFURFURYL
DERIVATIVES AS ANTIOZONANTS FOR
RUBBER
Frank Aloysius Vincent Sullivan, Westfield, and Tamara
Dejneka, Skillman, N.J., assignors to American Cyanamid Company, Stamford, Conn., a corporation of Maine
No Drawing. Filed May 18, 1967, Ser. No. 639,259
Int. Cl. C07d 5/04, 5/16
U.S. Cl. 260—347.7                      5 Claims

ABSTRACT OF THE DISCLOSURE

A compound of the formula:

wherein R is either furfuryl or tetrahydrofurfuryl and R' is phenyl or naphthyl, or lower-alkyl or lower alkoxy substituted phenyl or naphthyl, or the same as R; and the use of such a compound as an antiozonant in rubber compositions.

---

This invention relates to the provision of new and useful chemical compounds. It relates further to the provision of rubber compositions which are resistant to degradation due to ozonation. More particularly, the present invention relates to the provision of phenylene diamine derivatives having one furfuryl or tetrahydrofurfuryl radical on at least one of the two amino nitrogens, and an aryl radical on the remaining amino nitrogen, each amino nitrogen having a free hydrogen. The use of said compounds as antiozonants in rubber constitutes another aspect of the present invention.

It is well-known that natural and synthetic rubber are subject to degradation by atmospheric ozone. Ozone attack is especially pronounced in rubber vulcanizates which are under stress. In order to inhibit such deterioration, it has been common practice to incorporate into the rubber stock, prior to vulcanization, any of various compounds which have been recognized as possessing antiozonant activity. Among the various antiozonants previously used, are, for example, N,N'-di-2-octyl-p-phenylenediamine, N-phenyl-N'-cyclohexyl-p-phenylenediamine, N,N'-bis 3-(5-methylheptyl)-p-phenylenediamine and N,N'-di-sec. butyl-p-phenylenediamine.

An antiozonant must possess certain characteristics to be useful. Of course, it must provide protection against deterioration due to ozone and preferably be useful in both natural and synthetic rubber. It should be non-toxic under conventional rubber processing conditions and it should not be a skin irritant. It must have a sufficiently low vapor pressure to remain in the rubber during processing and sufficient solubility in the rubber to be able to continually migrate to the surface which is the situs of the ozone attack. Finally, it should be available at a reasonable cost.

It is an object of this invention to provide a new class of useful compounds. It is a further object of this invention to provide rubber compositions which have improved resistance to ozonation. Other objects will be apparent from the following description of the present invention.

The present invention is based upon the discovery of a new class of compounds, the members of which possess antiozonant activity in both natural and synthetic rubber. These compounds are furfuryl or tetrahydrofurfuryl derivatives of p-phenylenediamine represented by the following Formula I:

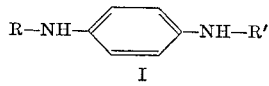

wherein R is a furfuryl or tetrahydrofurfuryl radical and R' is aryl or the same as R. Among the preferred aryl groups have up to two rings and are exemplified by phenyl and naphthyl as well as such groups with low-alkyl and lower-alkoxy substituents. These compounds satisfy the requirements for antiozonants in rubber.

The novel antiozonant compositions of this invention may be prepared conveniently by the reductive alkylation of p-phenylenediamine or an N-aryl-N-(4-aminophenyl) amine with either furfural or tetrahydrofurfuryl alcohol in the presence of a suitable alkylation catalyst such as palladium on charcoal, activated Raney nickel, platinum on charcoal, LiAlH$_4$, NaH, and the like. The reaction conditions used in the preparation of the compounds of this invention will vary depending on the facility of the alkylation. Thus, the alkylation may be conducted under a pressure of hydrogen up to about 3,000 p.s.i.g. or above, in an autoclave or at low pressure in a Parr Hydrogenator. The reaction may be conducted at a temperature of from about room temperature to about 115° C. in the presence of a diluent such as a lower aliphatic alcohol (C$_1$ to C$_4$), tetrahydrofuran, etc., or in the presence of an excess of the alkylating agent as a solvent. The amount of catalyst used to effect the alkylation is not especially critical, but will generally be from about 0.5% to about 5.0%, based on the total weight of reactants.

The antiozonants of the pesent invention may be used in various ways. The preferred way is to add the antiozonant to the rubber during compounding. The antiozonant may also be applied by dipping, painting, or spraying the rubber after it has been vulcanized, although these are not the most desirable ways to utilize the compounds. The amount of antiozonant employed may vary from about 0.5 to about 10.0 parts per 100 parts of rubber, but concentrations in the range of about 1.0 to 5.0 parts will generally satisfy normal requirements for ozone protection.

It is common practice in the rubber field to incorporate an antioxidant along wtih the antiozonant since antioxidants are generally inadequate as antiozonants and vice versa. The antiozonants of this invention do not differ from other known antiozonants in this respect. Any of the coventional antioxidants for rubber may be used in the usual amounts in conjunction with the antiozonants herein provided. Such usage may vary widely, of course, and is not a part of this invention.

In addition to natural rubber, the treatment of synthetic rubber is also contemplated by the present invention. The latter include, for example, rubber-like polymers of butadiene-1,3, or substituted butadiene-1,3 and copolymers thereof with other compounds polymerizable therewith. Examples of synthetic rubber-like polymers of butadiene-1,3 and substituted butadiene-1,3 are polybutadiene-1,3, polyisoprene, polychloroprene, and poly(2,3-dimethylbutadiene-1,3). Copolymers include those of butadiene-1,3 with polymerizable compounds containing an olefinic (—CH=CH—) group, such as styrene, vinyl acetate, vinyl chloride, vinyl naphthalene, acrylic acid and its esters, acrylonitrile, acrylamide, methacrylonitrile and its esters, methacrylamide, methacrylonitrile, isobutylene, methyl vinyl ether, methyl vinyl ketone, vinylidene chloride, and the like. Also included are ethylene-propylene, diene-modified elastomers.

The invention will be illustrated in greater detail by the following example, in which parts are by weight.

EXAMPLE 1

N,N'-difurfuryl-p-phenylenediamine

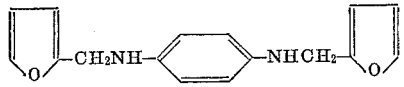

Into a 2-liter stainless steel autoclave was charged 10.8 parts, 0.1 mole of p-phenylenediamine and .21 part, .22 mole of furfural dissolved in 57.6 parts of tetrahydrofuran. To this was added 1.0 part of a catalyst consisting of 5% palladium on charcoal. The reaction was carried out for 3.5 hours at a temperature not in excess of 33° C. and under a hydrogen pressure of 1700 p.s.i.g. max. The reaction mixture was filtered to remove the catalyst and the tetrahydrofuran stripped off under vacuum. The residue was distilled in vacuo. The desired product distilled at 192° C. and 0.05 mm. Hg and crystallized from heptane, M.P. 64–65° C.

EXAMPLE 2

N,N'-ditetrahydrofurfuryl-p-phenylenediamine

A mixture of 1.1 parts, 0.01 mole of p-phenylenediamine, 6.1 parts, 0.06 mole of tetrahydrofurfuryl alcohol and 1.0 part of activated Raney nickel was reacted for 15 hours at 185° C. The reaction mixture was filtered while still hot and stripped free of unreacted tetrahydrofurfuryl alcohol. There was obtained a 65% yield of desired product, M.P. 45–55° C.

EXAMPLE 3

N-phenyl-N'-furfuryl-p-phenylenediamine

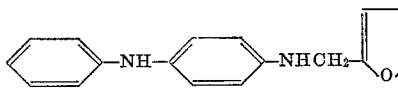

A mixture of 20.0 parts, 0.11 mole of 4-aminodiphenylamine, 9.0 parts, 0.094 mole of furfural was dissolved in 89 parts of tetrahydrofuran. To this solution was added 1 part of 5% palladium on charcoal. The reaction was carried out in a Parr Hydrogenator at room temperature for 1.5 hours under a hydrogen pressure of 40 p.s.i. The reaction mixture was filtered to remove the catalyst and stripped free of tetrahydrofuran. The desired product was obtained in 92% yield of adequate purity without distillation.

The corresponding N-naphthyl compound is prepared by substituting N-naphthyl-N-(4-aminophenyl)amine in the procedure of Example 3, for the amine used therein.

EXAMPLE 4

N-phenyl-N'-tetrahydrofurfuryl-p-phenylenediamine

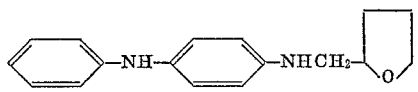

A mixture of 14.7 parts, 0.08 mole of 4-aminodiphenylamine, 8.45 parts, 0.088 mole of furfural, and 1.0 part of the catalyst of Example 1 was dissolved in 35.2 parts of tetrahydrofuran and reacted at 95° C. and a hydrogen pressure of 2500 p.s.i.g. max. until the theoretical amount of hydrogen was consumed. The reaction mixture was filtered and stripped free of solvent to obtain a viscous, dark liquid which was used without further purification.

EXAMPLE 5

A butadiene-styrene (SBR) formulation was prepared as follows:

| | Parts |
|---|---|
| Baytown 1600 [1] | 150.0 |
| Stearic acid | 1.5 |
| Paraffin wax | 2.0 |
| Zinc oxide | 5.0 |
| Sulfur | 2.0 |
| Accelerator [2] | 1.0 |
| Circosol 2-XH naphthenic oil | 6.0 |
| N-phenyl-N'-tetrahydrofurfuryl-p-phenylenediamine | 3.0 |

[1] Baytown 1600=100 parts cold SBR and 50 parts HAF (furnace black).
[2] N-oxydiethylene benzothiazole-2-sulfenamide.

The above composition was cured for 50 minutes at 144.5° C. in the form of a 6" x 6" sheet of 75 mil thickness. Samples from this sheet were then tested by exposure to atmospheric ozone of strips ¼" x 5¾" cut from the cured sheet. The strips were secured to a rack which at a predetermined number of cycles per minute, stretches and relaxes them, in an attempt to simulate the dynamic flexing of an automobile tire in use. The samples were flexed at about 10% and 20% elongations at 6 cycles per minute. Data are shown in the accompanying table.

TABLE I

| Dynamic ozone exposure test, visual rating | No antiozonant | N-phenyl-N'-tetrahydrofurfuryl-p-phenylenediamine |
|---|---|---|
| After 8 hours: | | |
| 10% | No cracks | No cracks. |
| 20% | Cracked edge | Do. |
| After 24 hours: | | |
| 10% | do | Do. |
| 20% | 2 cracked sides | Do. |
| After 32 hours: | | |
| 10% | 2 cracked sides pitted | Do. |
| 20% | Cracks on all sides | Cracked edge. |
| After 48 hours: | | |
| 10% | do | Do. |
| 20% | | 2 cracked edges. |
| Modulus at 300% (unaged) | 1,190 | 1,600. |
| Tensile strength (unaged) | 3,075 | 3,175. |
| Elongation, percent (unaged) | 600 | 525. |

EXAMPLE 6

A natural rubber formulation was prepared as follows:

| | Parts |
|---|---|
| Smoked sheets | 100.0 |
| Stearic acid | 2.0 |
| HAF carbon black | 25.0 |
| FF carbon black | 25.0 |
| Zinc oxide | 5.0 |
| Pine tar | 3.0 |
| Phenyl-naphthylamine | 1.0 |
| BLE-25 [1] | 1.0 |
| Sulfur | 2.25 |
| NOBS #1 [2] | 0.5 |
| N-phenyl-N'-tetrahydrofurfuryl-p-phenylenediamine | 3.0 |

[1] BLE-25: A high temperature condensation product of acetone and diphenylamine.
[2] NOBS #1: 90% oxydiethylenebenzothiazole-2-sulfonamide-10% mercaptobenzothiazolyldisulfide.

The above formula was cured 45 minutes at 141° C. Samples were tested as described in Example 5. A composition containing no antiozonant began to show signs of degradation after 8 hours exposure and failed after 72 hours. The composition containing N-phenyl-N'-tetrahydrofurfuryl-p-phenylenediamine protected the rubber composition for 186 hours before failure.

We claim:
1. A compound of the formula:

wherein R is either furfuryl or tetrahydrofurfuryl and R' is phenyl or naphthyl, or lower-alkyl or lower-alkoxy substituted phenyl or naphthyl, or the same as R.

2. The compound of claim 1 which is N,N'-difurfuryl-p-phenylenediamine.

3. The compound of claim 1 which is N,N'-ditetrahydrofurfuryl-p-phenylenediamine.

4. The compound of claim 1 which is N-phenyl-N'-furfuryl-p-phenylenediamine.

5. The compound of claim 1 which is N-phenyl-N'-tetrahydrofurfuryl-p-phenylenediamine.

References Cited

UNITED STATES PATENTS 3,391,107  7/1968  Stahly _____ 260—45.9

ALEX MAZEL, Primary Examiner
B. I. DENTZ, Assistant Examiner

U.S. Cl. X.R.
260—800

PO-1050
(5/69)

UNITED STATES PATENT OFFICE
CERTIFICATE OF CORRECTION

Patent No. 3,509,181          Dated April 28, 1970

Inventor(s) Frank Aloysius Vincent Sullivan and Tamara Dejneka

It is certified that error appears in the above-identified patent and that said Letters Patent are hereby corrected as shown below:

Column 3, line 5, "the following example," should read -- the following examples, --;

Column 5, claim 1, the formula reading

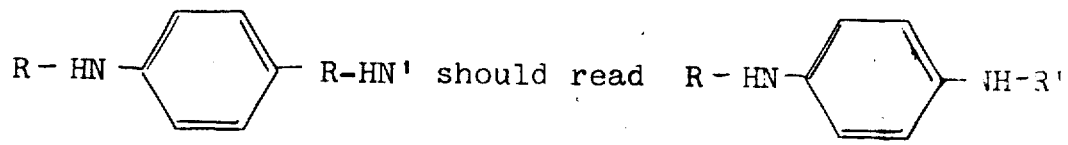

SIGNED AND
SEALED
SEP 22 1970

(SEAL)
Attest:

Edward M. Fletcher, Jr.
Attesting Officer

WILLIAM E. SCHUYLER, JR.
Commissioner of Patents

Disclaimer 3,509,181.—*Frank Aloysius Vincent Sullivan*, Westfield, and *Tamara Dejneka*, Skillman, N.J. FURFURYL AND TETRAHYDROFURFURYL DERIVATIVES AS ANTIOZONANTS FOR RUBBER. Patent dated Apr. 28, 1970. Disclaimer filed Mar. 15, 1971, by the assignee, *American Cyanamid Company*.

Hereby enters this disclaimer to claims 1, 4 and 5 of said patent.

[*Official Gazette June 15, 1971.*]